(12) United States Patent
Brand et al.

(10) Patent No.: US 9,459,710 B1
(45) Date of Patent: Oct. 4, 2016

(54) METHOD AND DEVICE FOR CHARGING STYLUS

(71) Applicant: Amazon Technologies, Inc., Seattle, WA (US)

(72) Inventors: Zachary Lawrence Brand, Mountain View, CA (US); Bela Incze, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/492,670

(22) Filed: Sep. 22, 2014

(51) Int. Cl.
*G06F 3/0354* (2013.01)
*G06F 3/038* (2013.01)
*H02J 7/00* (2006.01)

(52) U.S. Cl.
CPC ......... *G06F 3/03545* (2013.01); *G06F 3/0383* (2013.01); *H02J 7/00* (2013.01)

(58) Field of Classification Search
CPC .... G06F 1/1632; G06F 1/1656; G06F 1/266; G06F 2200/1632; G06F 3/033; G06F 3/0346; G06F 3/0354; G06F 3/03542; G06F 3/03545; G06F 3/038; G06F 3/0383; G06F 3/0386; G06F 3/039; H04M 1/0285; H02J 7/00; H02J 7/0042; H02J 7/0044; H02J 7/0077; H02J 7/0085; H02J 7/042; H02J 7/045; H02J 2007/0096
See application file for complete search history.

(56) References Cited

U.S. PATENT DOCUMENTS

| | | | | |
|---|---|---|---|---|
| 5,973,677 A * | 10/1999 | Gibbons | ............... | G06F 1/1626 178/18.04 |
| 6,249,276 B1 * | 6/2001 | Ohno | .................... | G06F 1/1626 345/173 |
| 6,744,426 B1 * | 6/2004 | Okamoto | ............ | G06F 3/03545 178/18.07 |
| 2009/0273587 A1 * | 11/2009 | Tsuei | .................. | G06F 3/03545 345/179 |
| 2010/0021022 A1 * | 1/2010 | Pittel | .................... | G06F 3/03545 382/123 |
| 2014/0078116 A1 * | 3/2014 | Mercea | ................... | G06F 1/266 345/179 |
| 2014/0176511 A1 * | 6/2014 | Lin | ...................... | G06F 3/03545 345/179 |
| 2014/0247006 A1 * | 9/2014 | Yu | ........................... | H02J 7/025 320/108 |
| 2014/0253032 A1 * | 9/2014 | Bruwer | ................... | H02M 1/36 320/108 |
| 2014/0300586 A1 * | 10/2014 | Dowd | ................ | G06F 3/03545 345/179 |

* cited by examiner

*Primary Examiner* — Keith Crawley
(74) *Attorney, Agent, or Firm* — Seyfarth Shaw LLP; Ilan N. Barzilay; Joseph M. Walker

(57) ABSTRACT

Systems, methods, and devices for charging a power source/battery of a stylus device through a conductive tip of the stylus device are disclosed. Voltage may be input into the stylus device through the conductive tip and applied to a rechargeable battery. This may be accomplished using a charging component, such as, a charging station or dock, including a corresponding electrical contact that interacts with the conductive tip to charge the battery of the stylus device. In this aspect, the stylus device may be configured to recognize when the stylus device is in the charging component and configure itself into a tip charging mode to receive voltage and charge the battery.

16 Claims, 15 Drawing Sheets

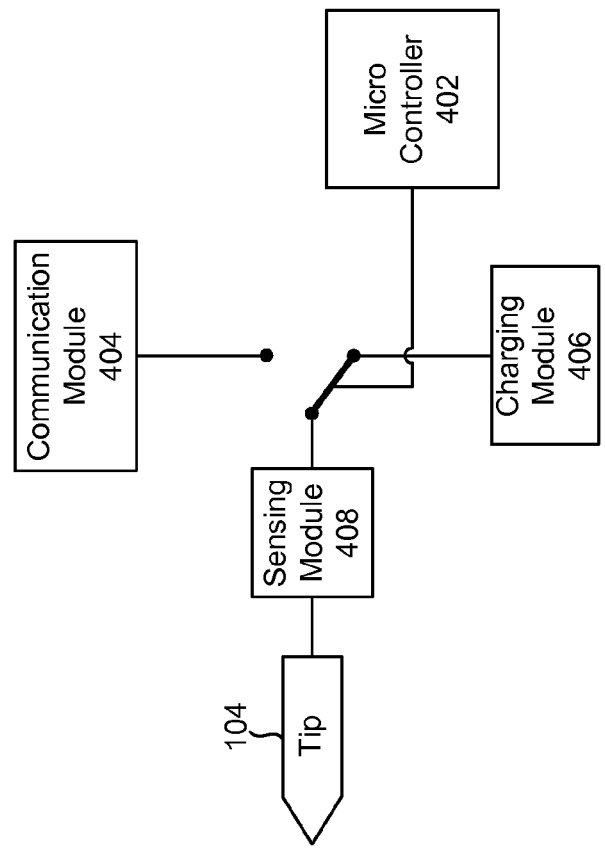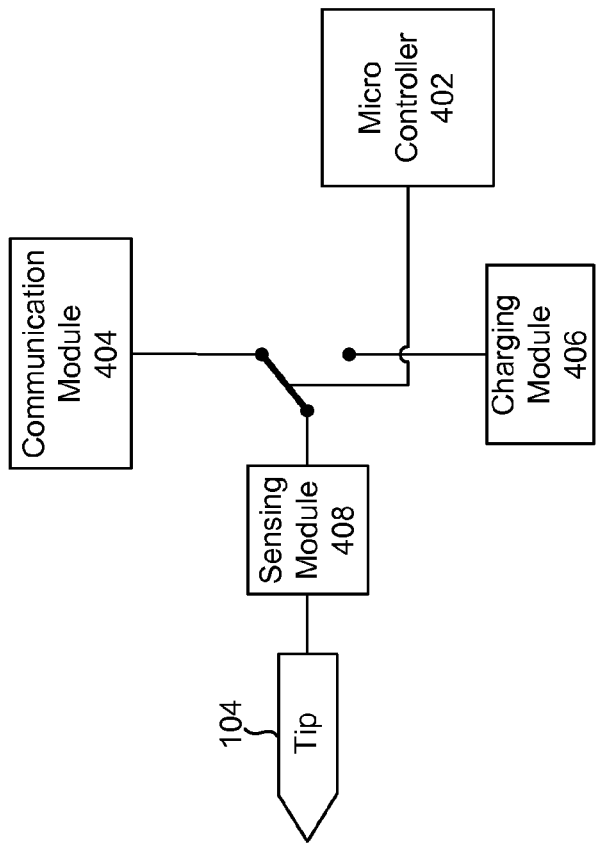

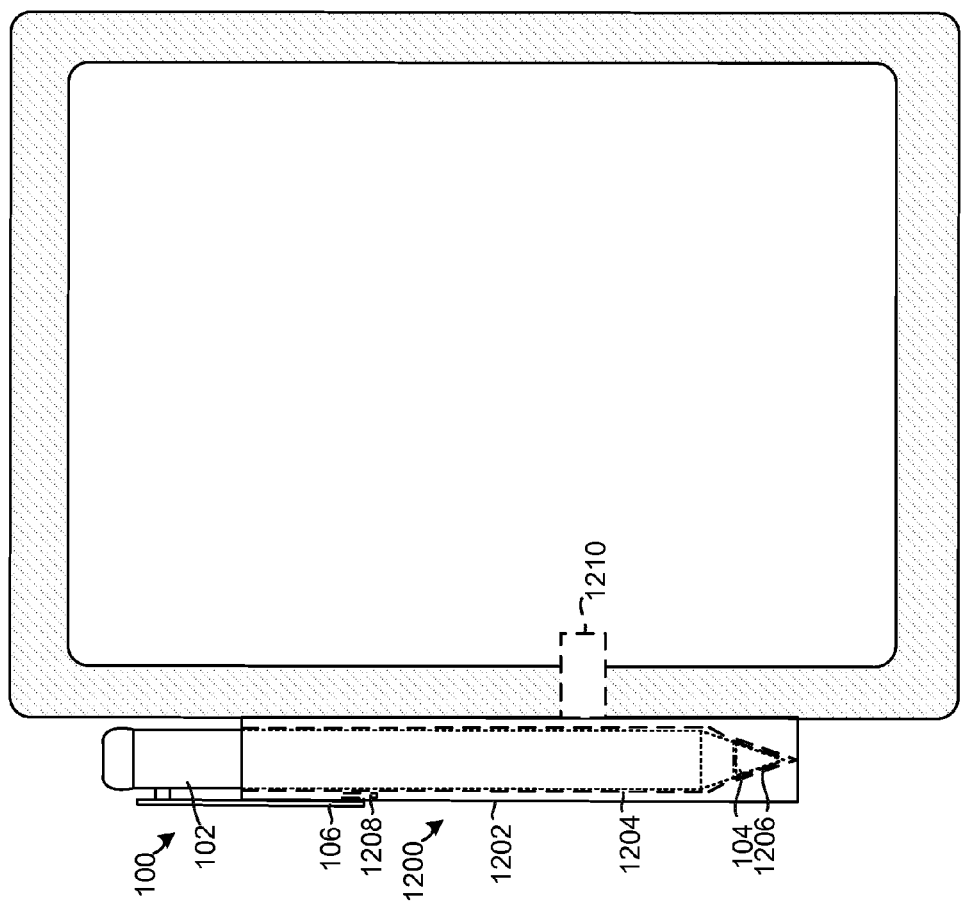

METHOD AND DEVICE FOR CHARGING STYLUS

BACKGROUND

With the advancement of technology the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils.

BRIEF DESCRIPTION OF DRAWINGS

For a more complete understanding of the present disclosure, reference is now made to the following description taken in conjunction with the accompanying drawings.

FIGS. 4A and 4B are functional block diagrams conceptually illustrating example components of a stylus device according to embodiments of the present disclosure.

FIGS. 12A and 12B illustrate an overview of another system for implementing embodiments of the present disclosure.

DETAILED DESCRIPTION

A stylus device typically comes in one of two configurations, a passive stylus, which is used to make physical contact with a computing device but otherwise lacks computing components, or an active stylus which may include computing and/or communication components that require a power source to operate. In general, current active stylus devices use removable batteries, such as AA, AAA, or AAAA batteries or the like. This requires users to periodically replace the batteries in the stylus device periodically or to periodically remove them for recharging. To obviate the need to remove a battery of a stylus device, an internal rechargeable battery, such as a rechargeable lithium ion battery, may be incorporated into a stylus device to make the stylus device rechargeable. However, the difficulty with incorporating such a rechargeable battery is incorporating corresponding charging circuitry and a charging port into the stylus device. Charging ports, such as universal serial bus (USB) type charging ports, can take up a large amount of space on a stylus device, thus impacting the design of the stylus device. For example, slim, sleek, and light stylus devices are desirable and a charging port can be detrimental to the look, feel, and size of the stylus device.

To charge a dischargeable power source, such as, a battery, of a stylus device without a charging port, a conductive tip or a tip connection port of the stylus device may be used as an electrical contact. For example, voltage may be input into the tip of stylus device through a conductive component of the tip or some other connection port as described below to charge a power source of the stylus device. This may be accomplished using a charging component, such as a charging station or dock, that includes a corresponding electrical contact that connects with the conductive tip or the tip connection port for the removable tip to provide power to the stylus device and thus charge the power source of the stylus device. In one embodiment, the stylus device may be configured to recognize when the stylus device is in the charging component and configure itself into a tip charging mode to receive voltage and charge the power source.

Figure 1:
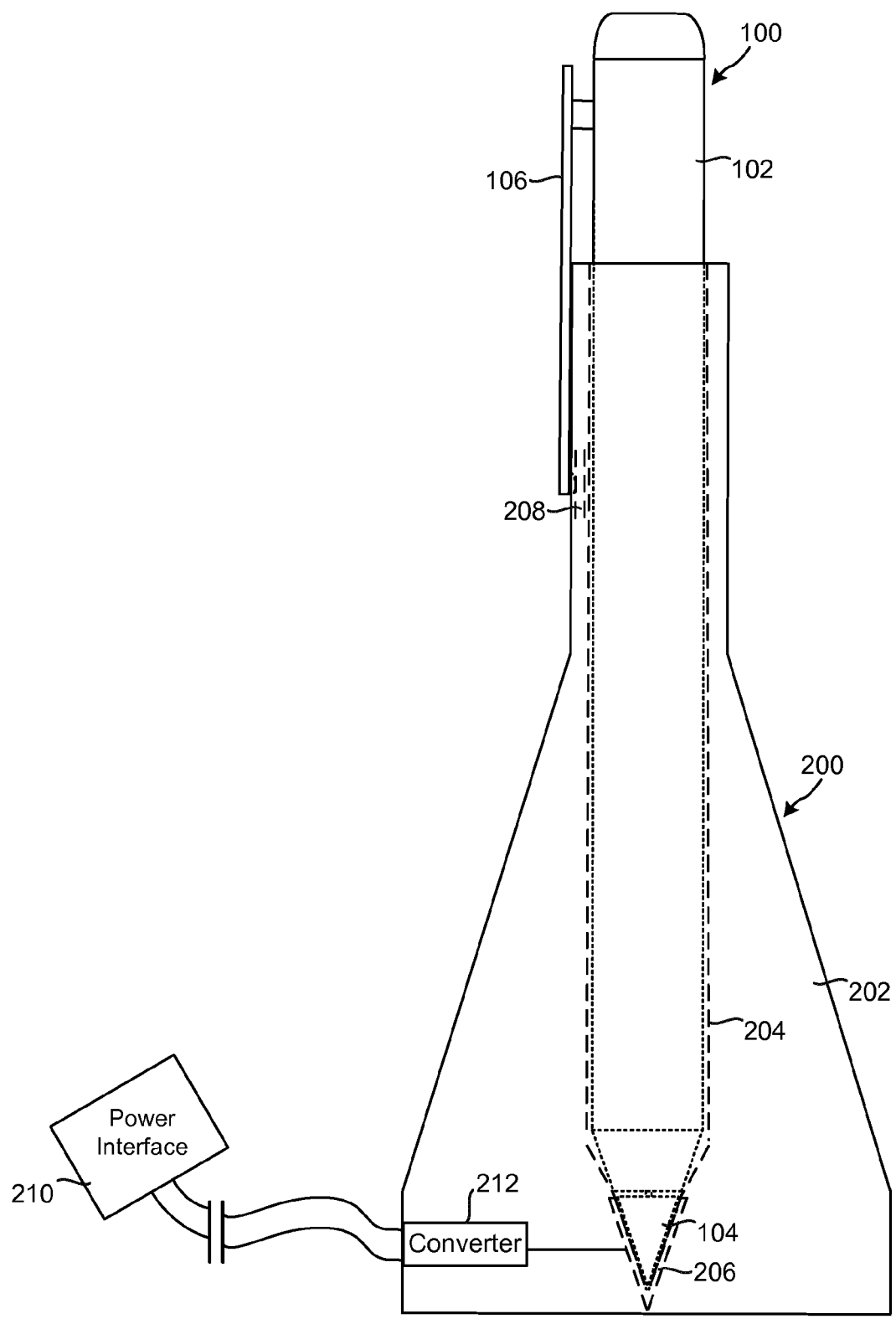
FIG. 1 illustrates an overview of a system for implementing embodiments of the present disclosure.

FIG. 1 illustrates an overview of a system for implementing embodiments of the disclosure. The system includes a stylus device 100 and a charging component 200. The charging component 200 may be configured as a separate charging component 200, such as a dock that physically holds the stylus device 100 in place. Alternatively, the charging component 200 may be integrated into a separate device, such as a tablet, etc. The stylus device 100 includes a body 102, a tip 104, and a clip 106 coupled to the body 102. In this embodiment, the tip 104 is a conductive tip. For example, the tip 104 may be a multi-component mechanical part including a conductive polymer coating molded over a core material. In one example, the conductive polymer coating may be a soft polymer, a medium polymer, and/or a hard polymer capable of receiving a voltage from the charging component 200 and the core material may be a metallic shaft or metallic core. Example conductive polymers may include polyphenylenes, polypyrenes, polyacetylenes, or the like. When the stylus device 100 is in a tip communication mode, the conductive polymer and core of the tip 104 allow the tip 104 to function as an electrode and electromagnetically transmit and receive data to and from a computing device. When the stylus device 100 is in a tip charging mode, for example, when the stylus device 100 is in the charging component 200, the tip 104 may function as an electrical contact and receive voltage from the charging component 200. Similarly, the clip 106 may also be conductive and function as an electrical contact that interacts with the charging component 200. In this embodiment, the clip 106 may function as a ground connection. Thus the tip 104 and clip 106 may function as electrical contacts that couple to corresponding electrical contacts of the charging component 200 to form a circuit. This allows the stylus device to receive voltage from the charging component 200 to charge a rechargeable power source disposed in the stylus device 100.

The charging component 200 includes a body 202 and a receiving area 204 for receiving the stylus device 100 to charge the stylus device 100. As illustrated, the receiving area 204 is shaped to receive the tip 104 in a bottom portion of the receiving area 204. For example, the bottom portion of the receiving area 204 may be shaped as an inverted cone to receive the tip 104. A first electrical contact 206 is disposed in the body 202 at the bottom portion of the receiving area 204 and positioned to face the inside of receiving area 204 so that the first electrical contact 206 may contact the tip 104 when the stylus device 100 is positioned inside the charging component 200 and disposed in the receiving area 204. A second electrical contact 208 is also disposed in the body 202. The second electrical contact 208 is positioned to face the exterior of body 202 so that the second electrical contact 208 may contact the clip 106 to provide a ground connection when the stylus device 100 is positioned inside the charging component 200 and disposed in the receiving area 204.

The charging component 200 may include a power interface 210 for receiving input voltage from an external power supply. The power interface 210 may be any type of interface for mating with and receiving power from an external power supply. For example, the power interface 210 may be a plug for mating with a wall outlet, a USB, or other type of power interface. A converter 212 may be disposed in the body 202 and in electrical communication with the first electrical contact 206. In an example, the converter 212 may be an AC to DC converter, a transformer, etc. that converts input AC voltage from the external power supply to DC voltage for charging the battery of the stylus device 100. It should be appreciated that the charging component 200 may also include one or more filters, rectifier circuits, power correction circuits, transformers, resistors, inductors, capacitors, etc., as known in the art, to filter and reduce the input voltage to charger the battery of the stylus device 100.

In this embodiment, the stylus device 100 is disposed in the charging component 200 with the tip 104 contacting and in electrical communication with the first electrical contact 206 and the clip 106 contacting and in electrical communication with the second electrical contact 208. The voltage to charge the battery of the stylus device 100 is applied to the tip 104 by the first electrical contact 206, and the clip 106 and electrical contact electrode function as ground to complete the charging circuit.

As described above, the tip 104 may also function as an electrode, and in a tip communication mode may electromagnetically transmit and receive data to and from a computing device using a capacitive channel. In one example, the tip 104 may receive a signal from the computing device, the stylus device 100 resonates based on the received signal and reiterates the signal back to the computing device to communicate. To identify when the stylus device 100 is to be charged, the stylus device 100 may check for a voltage being applied to the tip 104, this check may be performed when the stylus device 100 is or is not transmitting or receiving data through the tip 104. If there is a voltage being applied to the tip, the stylus device 100 may then disconnect or decouple the tip 104 from a communication module and connect or couple the tip 104 to a charging module to allow the battery of the stylus device 100 to be charged.

Figure 2:
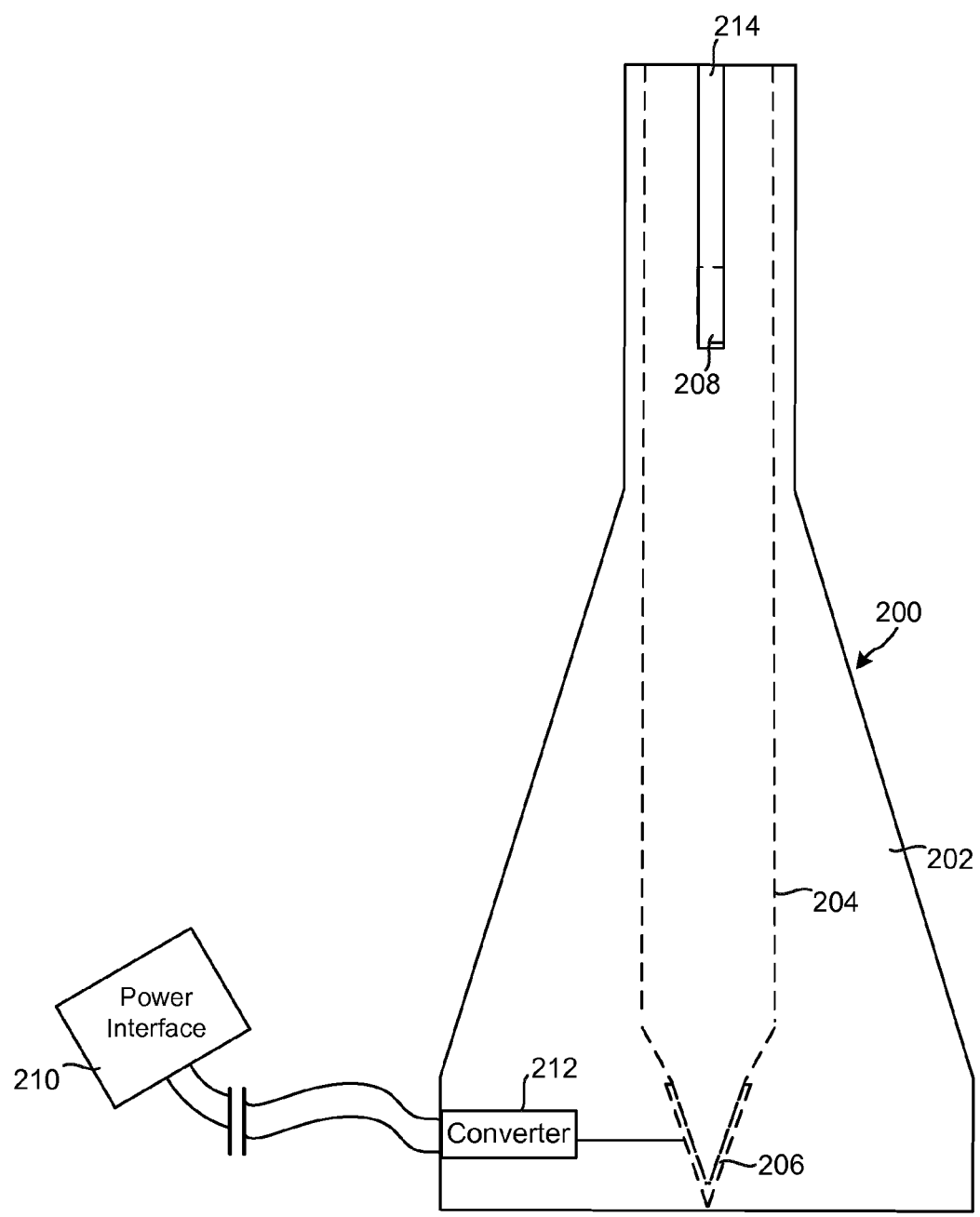
FIG. 2 illustrates a charging component according to embodiments of the present disclosure.

In one embodiment, the second electrical contact 208 may be configured as a ring surrounding the upper portion of the body 202 of the charging component 200 so that an electrical contact between the second electrical contact 208 and the clip 106 is maintained regardless of the orientation of the clip 106 of the stylus device 100 when the stylus device is connected to the charging component 200. In another embodiment, referring to FIGS. 1 and 2, the charging component 200 may include a channel or recess 214 that receives the clip 106 of the stylus device 100. This ensures the stylus device 100 is placed in the charging component 200 in a proper orientation to align the second electrical contact 208 with the clip 106. This recess may be internal to the body 202, for example, located in an interior surface of the receiving area 204 or may be on an exterior surface of the charging component 200.

Figure 3:
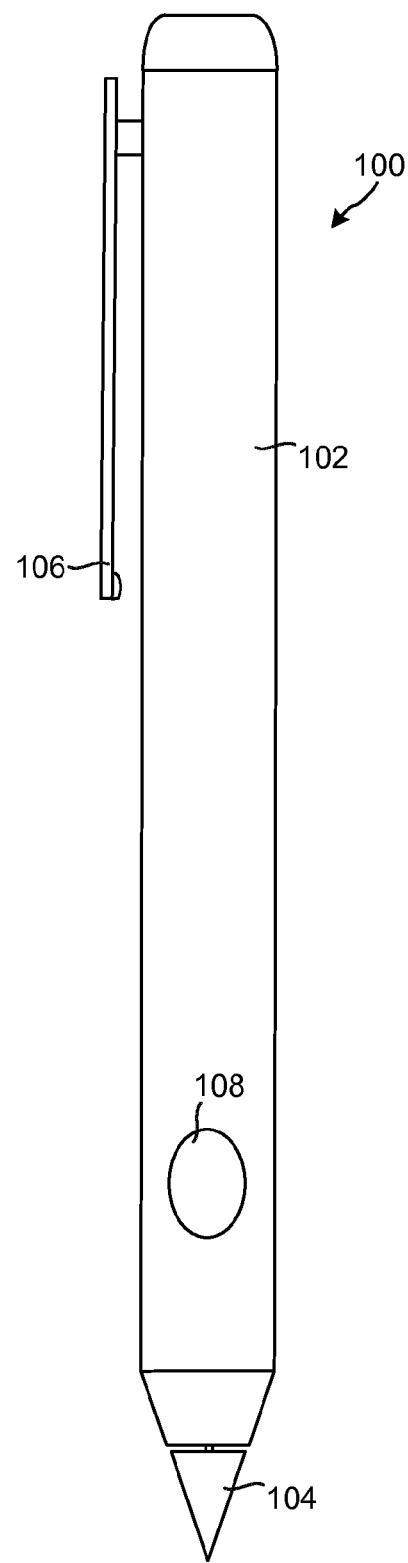
FIG. 3 illustrates a stylus device according to embodiments of the present disclosure.

Referring to FIGS. 1 and 3, the stylus device 100 may also include a sensor 108. The sensor 108 may be used to detect when a user is holding the stylus device 100. The sensor 108 may be a capacitive sensor, pressure sensor, or other sensor. In one embodiment, a capacitive sensor 108 may also be configured to detect an electronic signal from the charging component 200 that signals to the stylus device 100 that the stylus device 100 is disposed in the charging component 200 and the battery is to be charged. The stylus device 100 may then configure itself into the tip charging mode, in which the tip 104 is connected to the charging module to allow the battery of the stylus device 100 to be charged. The charging component 200 may include a conductive and/or metal interior surface of the receiving area 204 (for example, forming a collar around the capacitive sensor 108) which carries and transmits the electronic signal that is detected by the capacitive sensor 108. The signal may include a single signal or a sequence of signals that is stored on the stylus and indicates to the stylus device to enter a tip charging mode.

Referring to FIGS. 4A and 4B, the stylus device 100 may include the tip 104, a micro controller 402, a communication module 404, a charging module 406, and a sensing module 408. The communication module 404 may include circuitry and components such as an instrumentation amplifier and a low leakage single-pole single-throw (SPST) switch, one or more resisters, one or more noise filtering components, such as a band pass filter and an automatic gain controller, and/or other components to provide a communication interface between a touch controller of a computing device and the stylus device 100. It should be appreciated that the circuitry of the communication module 404 is not damaged by an applied voltage, such as the voltage to recharge the stylus device 100. The charging module 406 may include circuitry to receive charge from the tip 104 and apply that charge to the power source/battery or may be configured to route charge to the power source/battery. The communication module 404 and the charging module 406 may use the same physical circuitry, but function differently to transmit and receive data through the tip 104 and receive a voltage through the tip 104, respectively. For example, the communication module 404 and the charging module 406 may be implemented by changing an internal multiplexer (MUX) of the stylus device 100 to cause the stylus device 100 to switch from the tip charging mode to the tip communication mode and vice versa.

In FIG. 4A the stylus device 100 is illustrated in the tip communication mode, in which the tip 104 is connected to the communication module 404. In this mode, the tip 104 functions as an electrode and may electromagnetically transmit and receive data, for example to and from a computing device such as a tablet, phone, or the like. In FIG. 4B the stylus device 100 is illustrated in the tip charging mode, in which the tip 104 is connected to the charging module 406. In this mode, the tip 104 functions as an electrical contact and receives voltage from the charging component 200 and applies the voltage to the power source/battery of the stylus device 100.

To identify or determine when the stylus device 100 should be in the tip charging mode versus the tip communication mode, the stylus device 100 may include a sensing module 408 that check for and detects a voltage being applied to the tip 104 and/or a signal from the charging component 200 as described above. The voltage may be a known square wave or a signal distinct from the communication of data. In this respect, the sensing module 408 can recognize when the stylus device 100 is being charged.

When the stylus device is in the tip communication mode and the sensing module 408 detects a signal from the charging component or a charging voltage being applied, for example to the tip 104, the stylus device 100 enters the tip charging mode. Similarly, when the sensing module 408 detects the signal from the charging component or a charging voltage is no longer being applied or have been disconnected, the stylus device 100 may configure itself back to the tip communication mode.

Figure 5:
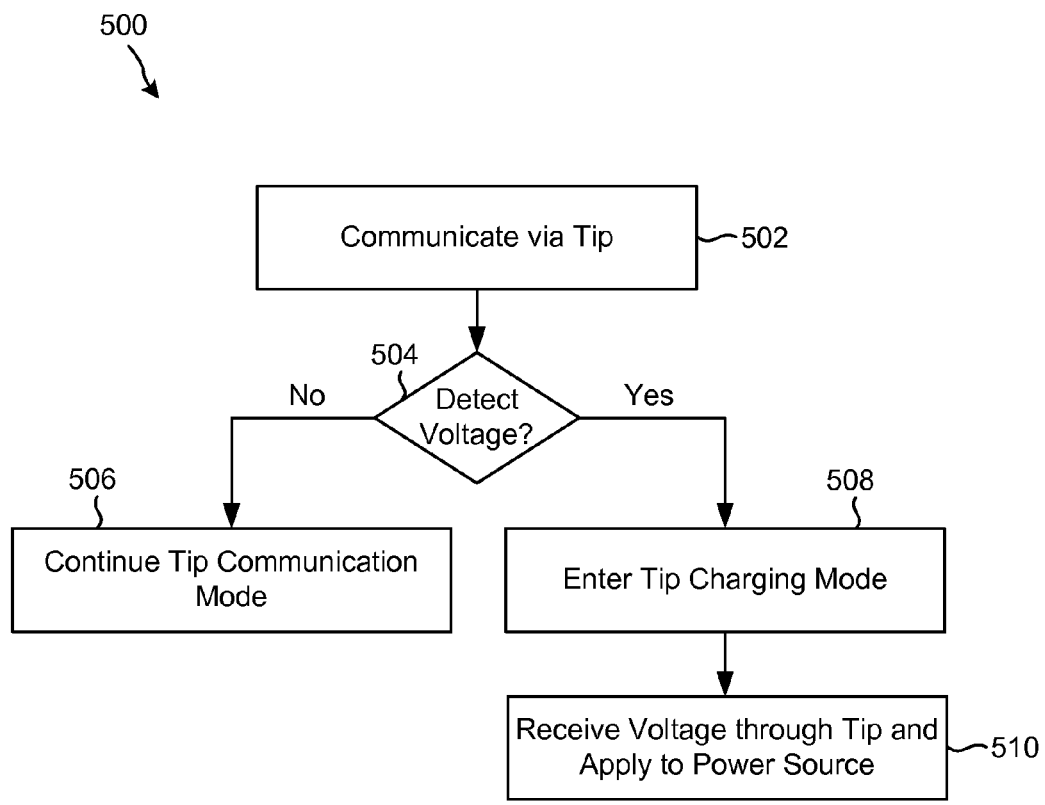
FIG. 5 illustrates an exemplary method of charging a stylus device according to embodiments of the present disclosure.

FIG. 5 illustrates an exemplary method 500 of switching the stylus device from a tip communication mode to a tip charging mode by checking for voltage being applied to the tip. In block 502, the stylus device may be communicating via the tip. The stylus device may check for a voltage being applied to the tip, illustrated as block 504. This check may occur during a pause in communication via the tip or may be performed during such communication. Tip communication mode may correspond to the configuration of FIG. 4A while tip charging mode may correspond to the configuration of FIG. 4B.

When no voltage is detected as being applied to the tip, the stylus device may remain in the tip communication mode and continue communicating, or potentially enter an off mode if communications have been concluded, illustrated as block 506. However, when a voltage is detected as being applied to the tip, the stylus device may enter a tip charging mode, illustrated as block 508, for example by decoupling the tip communication module from the tip and coupling the charging module to the tip. The stylus device then receives the voltage through the tip and applies the voltage to the power source/battery of the stylus device to charge the power source/battery, illustrated as block 510.

Figure 6:
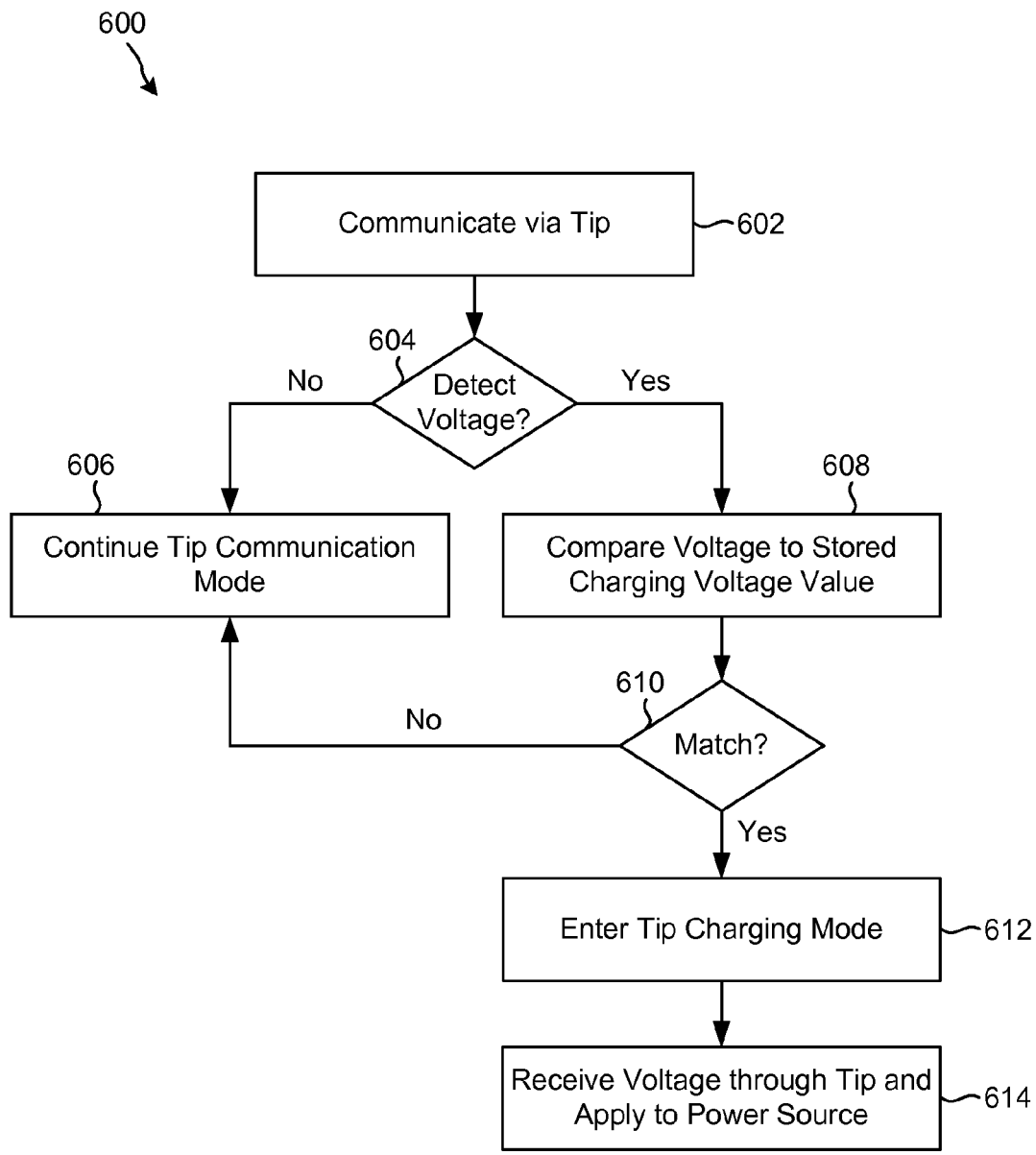
FIG. 6 illustrates an exemplary method of charging a stylus device according to embodiments of the present disclosure.

In another embodiment, to avoid accidental or false indications that the stylus device is disposed in the charging component, the stylus device may be set to charge the power source/battery only when a preset voltage value is applied to the tip. FIG. 6 illustrates an exemplary method 600 of charging the stylus device in this manner. In block 602, the stylus device may be communicating using the tip. The stylus device may check for a voltage being applied to the tip, illustrated as block 604. This check may occur during a pause in communication via the tip or may be performed during such communication. When no voltage is detected as being applied to the tip, the stylus device may continue tip communication or potentially enter an off mode, illustrated as block 606. However, when a voltage is detected as being applied to the tip, the stylus device may compare the applied voltage to a stored threshold voltage value, illustrated as block 608, and determine if the applied voltage substantially matches or exceeds the stored threshold voltage value (i.e., is within a certain amount of the stored threshold voltage value), illustrated as block 610. When the applied voltage does not substantially match the stored threshold voltage value, the stylus device may continue tip communication, illustrated as block 606. On the other hand, when the applied voltage substantially matches the stored voltage value, the stylus device may enter the tip charging mode, illustrated as block 612. The stylus device then receives the applied voltage through the tip and applies the voltage to the power source/battery of the stylus device to charge the power source/battery, illustrated as block 614.

Figure 7:
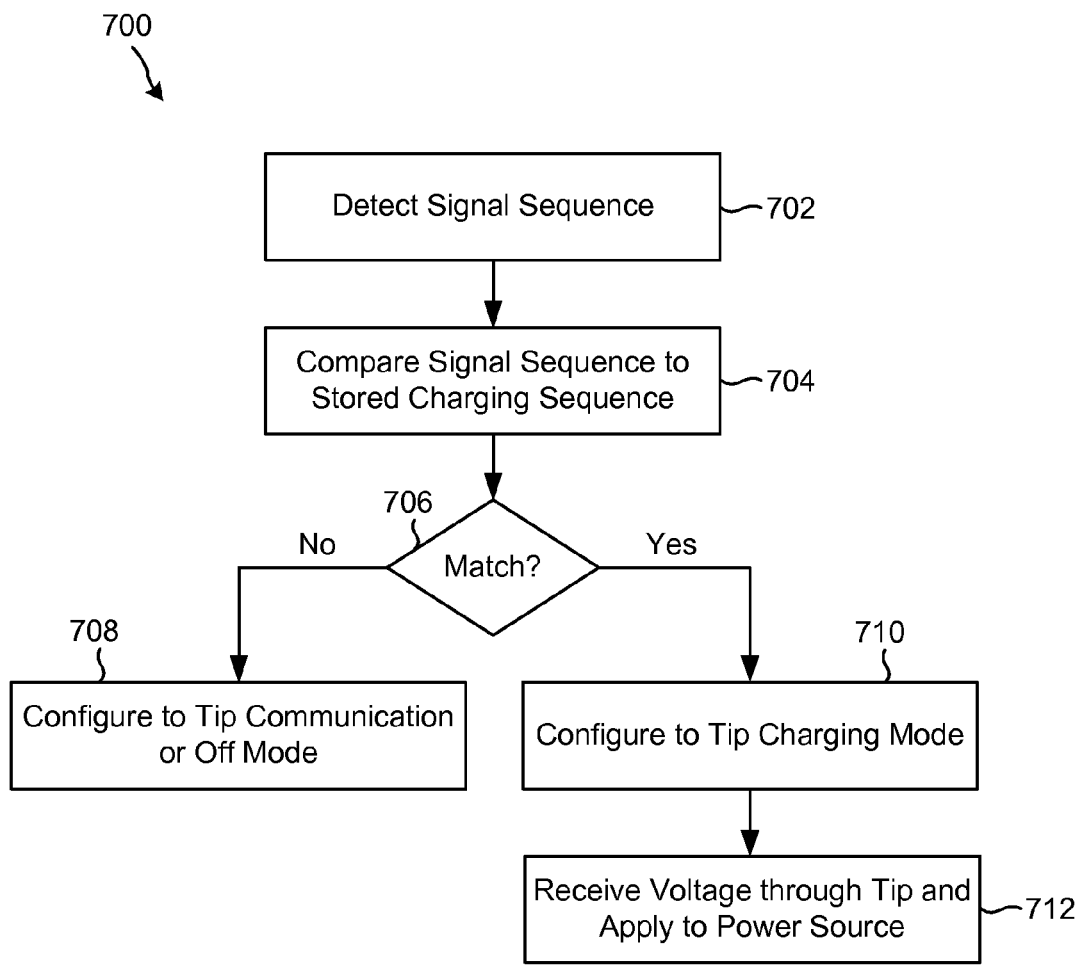
FIG. 7 illustrates an exemplary method of charging a stylus device according to embodiments of the present disclosure.

In yet another embodiment, the stylus device may identify or determine when the stylus device should be in the tip charging mode versus the tip communication mode or an off mode by detecting a signal from the charging component. FIG. 7 illustrates an exemplary method 700 of charging the stylus device by detecting a signal, for example, via the capacitive sensor 108, from the charging component. The signal may be in the form of a varying capacitance between the capacitive sensor 108 and the charging component. The stylus device, for example via the capacitive sensor 108, may then generate a signal based on the varying capacitance. That signal may be sent to the processor of a stylus. Thus, in block 702, the stylus device, for example, via the capacitive sensor, may detect a signal from the charging component. The stylus device may then compare the signal to a stored preset signal, illustrated as block 704, and determine if the detected signal substantially matches the stored preset signal, illustrated as block 706. The comparing may include comparing a sequence of pulses, amplitude, frequency, and/or other aspect of the signal/varying capacitance to the stored preset signal. When the detected signal does not substantially match the stored preset signal, the stylus device may configure itself back into or stay in the tip communication mode or potentially the off mode, illustrated as block 708. When the detected signal substantially matches the stored preset signal, the stylus device may configure itself into the tip charging mode, illustrated as block 710. The stylus device then receives the applied voltage through the tip and applies the voltage to the power source/battery of the stylus device to charge the power source/battery, illustrated as block 712. Thus the conductive tip may be coupled to the charging circuitry in response to detecting the signal and/or the varying capacitance.

Figure 8:
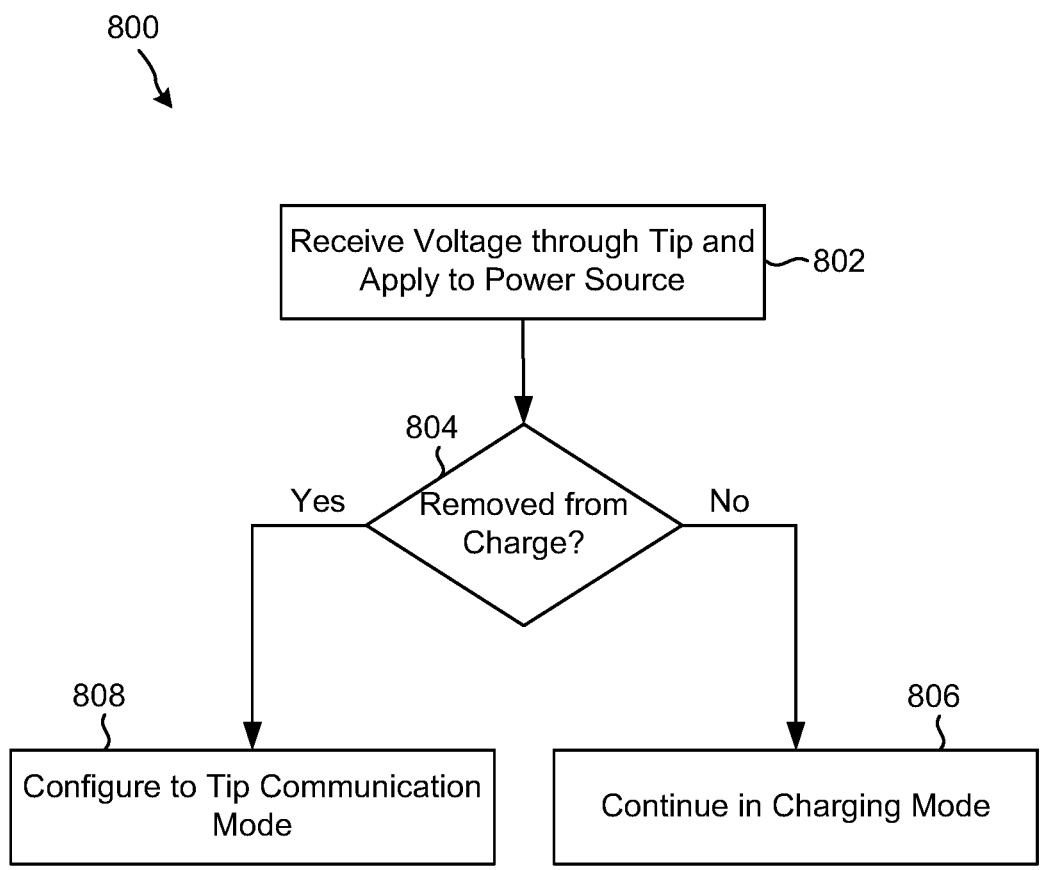
FIG. 8 illustrates an exemplary method of charging a stylus device according to embodiments of the present disclosure.

It should be appreciated that when the stylus device is removed from the charging component and not being charged anymore, the stylus device may configure itself from the tip charging mode into the tip communication mode. FIG. 8 illustrates an exemplary method 800 of configuring the stylus device out of the tip charging mode when the stylus device is removed from the charging component. In block 802, the stylus device is receiving an applied voltage through the tip and applying the voltage to the power source/battery of the stylus device to charge the power source/battery. The stylus device may check to determine whether the voltage is continuing to be applied to the tip to determine whether the stylus device has been removed from the charging component, illustrated as block 804. When the voltage continues to be detected as being applied to the tip, the stylus device may continue to remain in the tip charging mode, illustrated as block 806. However, when the voltage discontinues to be detected as being applied to the tip, the stylus device may transition to the tip communication mode or potentially enter an off mode, illustrated as block 808.

Figure 9:
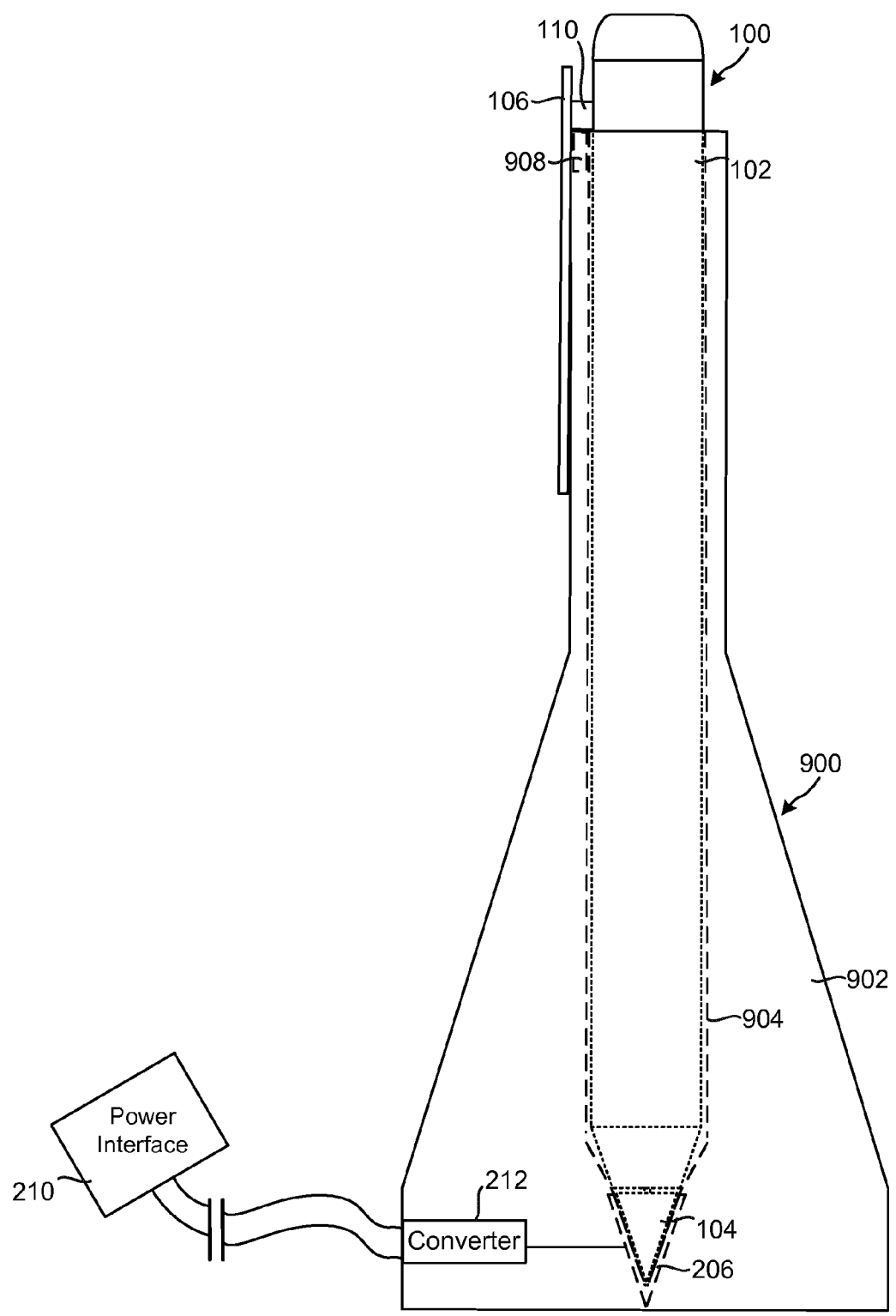
FIG. 9 illustrates an overview of another system for implementing embodiments of the present disclosure.

FIGS. 9-12 illustrate additional embodiments of the stylus device 100 and the charging component that may be implemented to charge the power source/battery of the stylus device 100. A charging component 900 similar to the charging component 200 is illustrated in FIG. 9. However, the charging component 900 is modified to position a second electrical contact 908 to contact and electrically communicate with a conductive mount or mounting portion 110 of the clip 106. Similar to the charging component 200, the charging component 900 includes a body 902 and a receiving area 204 for receiving the stylus device 100 to charge the stylus device 100. A first electrical contact 206 is disposed in the body 902 at the bottom portion of the receiving area 204 and positioned to surround and contact the tip 104 when the stylus device 100 is disposed in the receiving area 204. The second electrical contact 908 is also disposed in the body 902. In this embodiment, the second electrical contact 908 is positioned to contact the mounting portion 110 of the clip 106 to provide the ground connection when the stylus device 100 is disposed in the receiving area 204.

Figure 10:
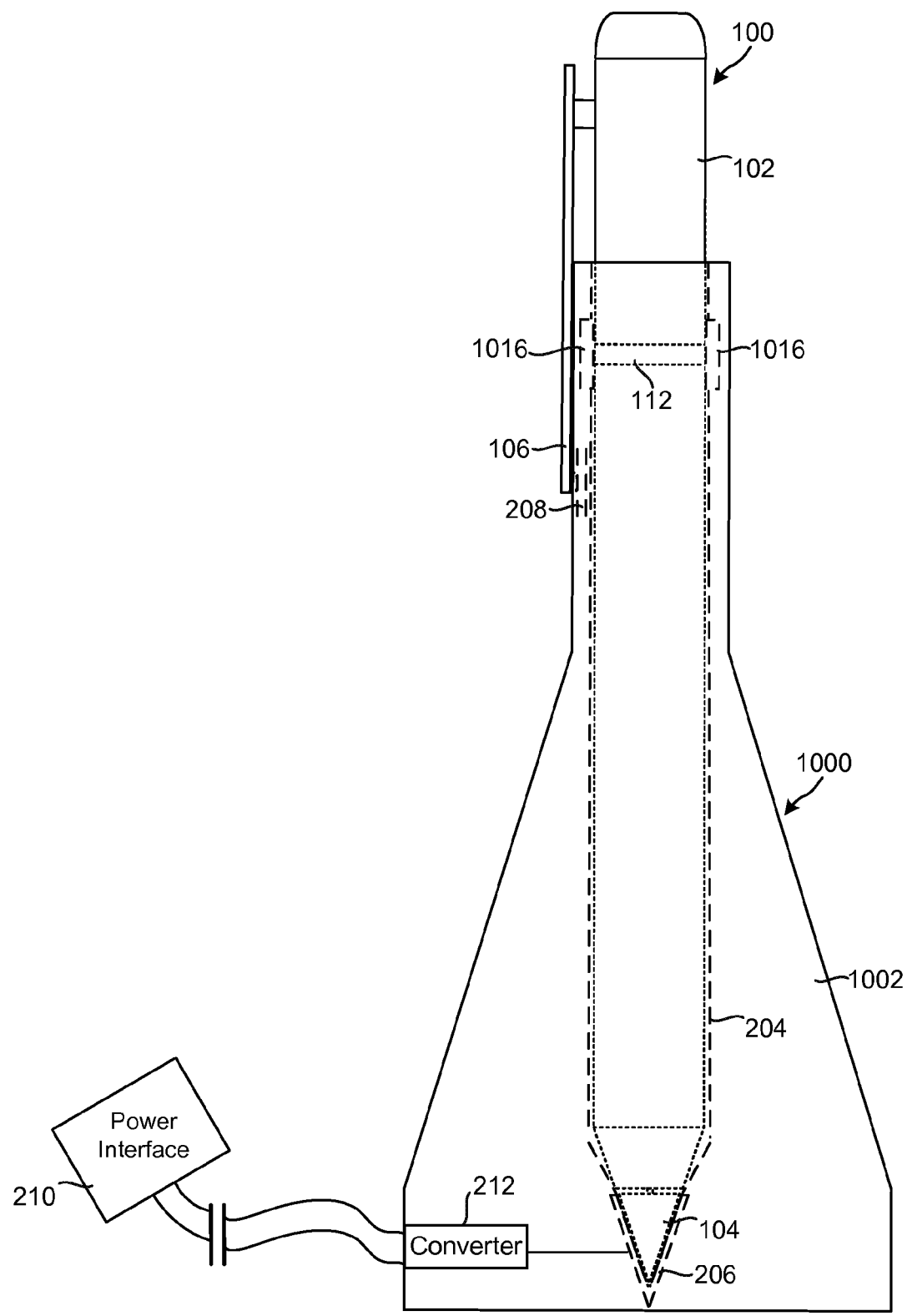
FIG. 10 illustrates an overview of another system for implementing embodiments of the present disclosure.

In an embodiment, referring to FIG. 10, a charging component 1000 may include one or more third electrical contacts 1016 and the stylus device 100 includes a corresponding electrical contact 112. As illustrated, the electrical contact 112 is a ring disposed around the body 102 of the stylus device 100. However, it should be appreciated that the electrical contact 112 may have a shape other than a ring as well. Similar to the second electrical contact 208, the third electrical contact(s) 1016 is disposed in the body 1002 of the charging component 1000 and positioned to contact the electrical contact 112 of the stylus device 100 when the stylus device 100 is disposed in the receiving area 204.

In this embodiment, when the stylus device 100 is disposed in the receiving area 204, the tip 104 and the first electrical contact 206 may provide a voltage high connection, the third electrical contact(s) 1016 and the electrical contact 112 may provide a voltage low (i.e., signal ground) connection, and the second electrical contact 208 and the clip 106 may provide an earth ground connection. Other configurations of the specific charging circuit (i.e., voltage high, voltage low, or earth ground) may also be implemented.

Having two separate ground connections on the stylus device 100 may also enable the stylus device to detect when the stylus device 100 is disposed in and electrically connected to the charging component 1000. For example, the stylus device 100 may detect when both the clip 106 and the electrical contact 112, are connected. When both are connected, the stylus device 100 may configure itself into the tip charging mode, and receive the voltage through the tip and apply the voltage to the power source/battery of the stylus device 100 to charge the power source/battery.

Figure 11:
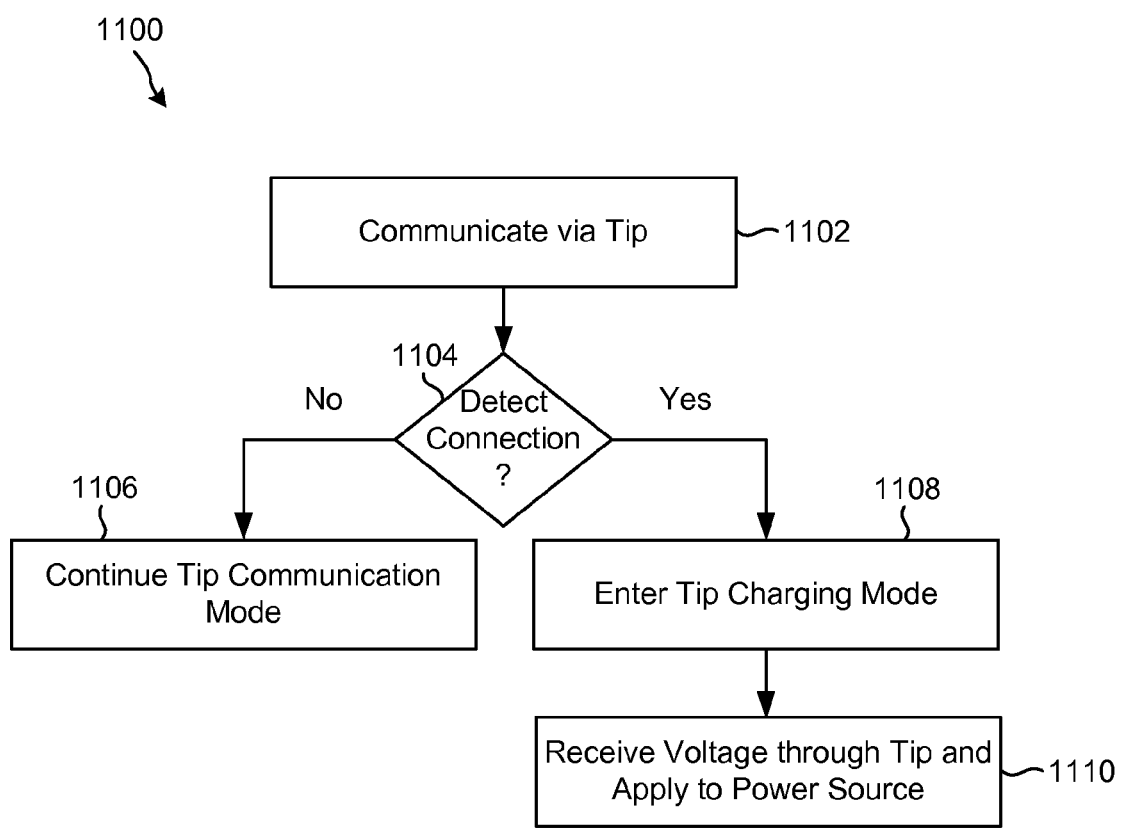
FIG. 11 illustrates an exemplary method of charging a stylus device according to embodiments of the present disclosure.

FIG. 11 illustrates an exemplary method 1100 of charging the stylus device by upon detecting connections of the various electrical connectors on the stylus. In block 1102, the stylus device may be communicating via the tip. The stylus device may check for connection of the various electrical connectors on the stylus device, illustrated as block 1104. This check may occur during a pause in communication via the tip or may be performed during such communication. When no connection is detected, the stylus device may resume tip communications or potentially enter an off mode, illustrated as block 1106. However, when connections are detected, the stylus device may enter a tip charging mode, illustrated as block 1108. The stylus device then receives the voltage through the tip and applies the voltage to the power source/battery of the stylus device to charge the power source/battery, illustrated as block 1110.

Figure 12A:
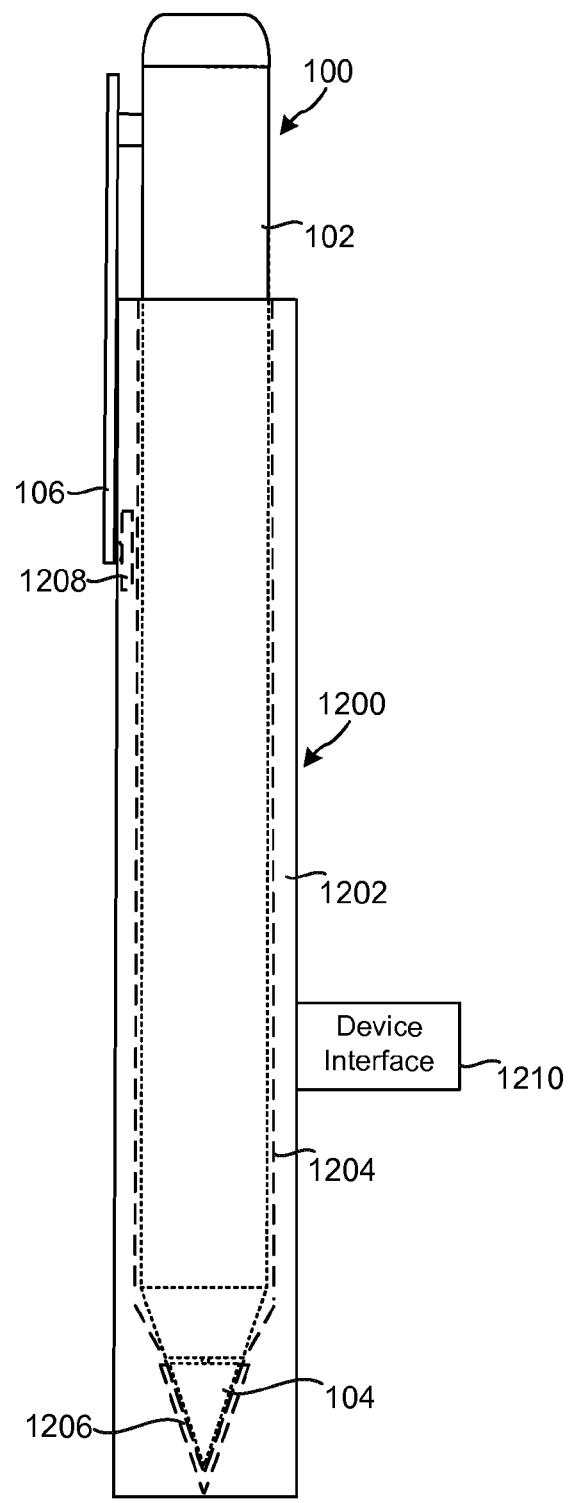

In another embodiment, a charging component 1200 is illustrated in FIGS. 12A and 12B. Charging component 1200 may include various components of other charging components illustrated above, however, the charging component 1200 is modified to also connect to a port of a computing device. Similar to the charging component 200, the charging component 1200 includes a body 1202 (which may have a smaller design to mimic a holder for the stylus device 100 while connecting to the computing device) and a receiving area 1204 for receiving the stylus device 100 to charge the stylus device 100. A first electrical contact 1206 is disposed in the body 1202 at the bottom portion of the receiving area 1204 and positioned to surround and contact the tip 104 when the stylus device 100 is disposed in the receiving area 1204. A second electrical contact 1208 is also disposed in the body 1102. In this embodiment, the second electrical contact 1208 is positioned to contact the clip 106 to provide the ground connection when the stylus device 100 is disposed in the receiving area 1204. The charging component 1200 also includes a device interface 1210 in the form of an interface designed to connect to a computing device, for example, a USB interface, a firewire interface, a thunderbolt interface, etc. extending from a side of the body 1202 for receiving input voltage from the computing device. It should be appreciated that the charging component 1200 may also include one or more converters (for example, AC/DC converters), filters, rectifier circuits, power correction circuits, transformers, resistors, inductors, capacitors, etc., as known in the art, to filter and reduce the input voltage to charger the battery of the stylus device 100. As illustrated, the device interface 1200 protrudes from the charging component 1200 as a male connector, however the interface may also be implemented as a female connector, where a component of a computing device is inserted into the charging component 1200 to link the charging component to the computing device.

In some embodiments, the tip 104 of the stylus device 100 may not be conductive. In these embodiments, the tip 104 may be replaceable and may couple to the stylus device 100 by having the core (for example, a metal core) electrically couple to a connection port in the stylus device 100. When the tip 104 is not conductive, but is replaceable, the power source/battery of the stylus device may be charged in a similar manner as described above, except that the input voltage may be applied to the connection port of the stylus device 100. In this respect, the first electrode of the charging component may be modified to include a metal electrical connection extending into the receiving area that is sized and shaped to mate with and electrically couple to the connection port of the stylus device 100.

Figure 13:
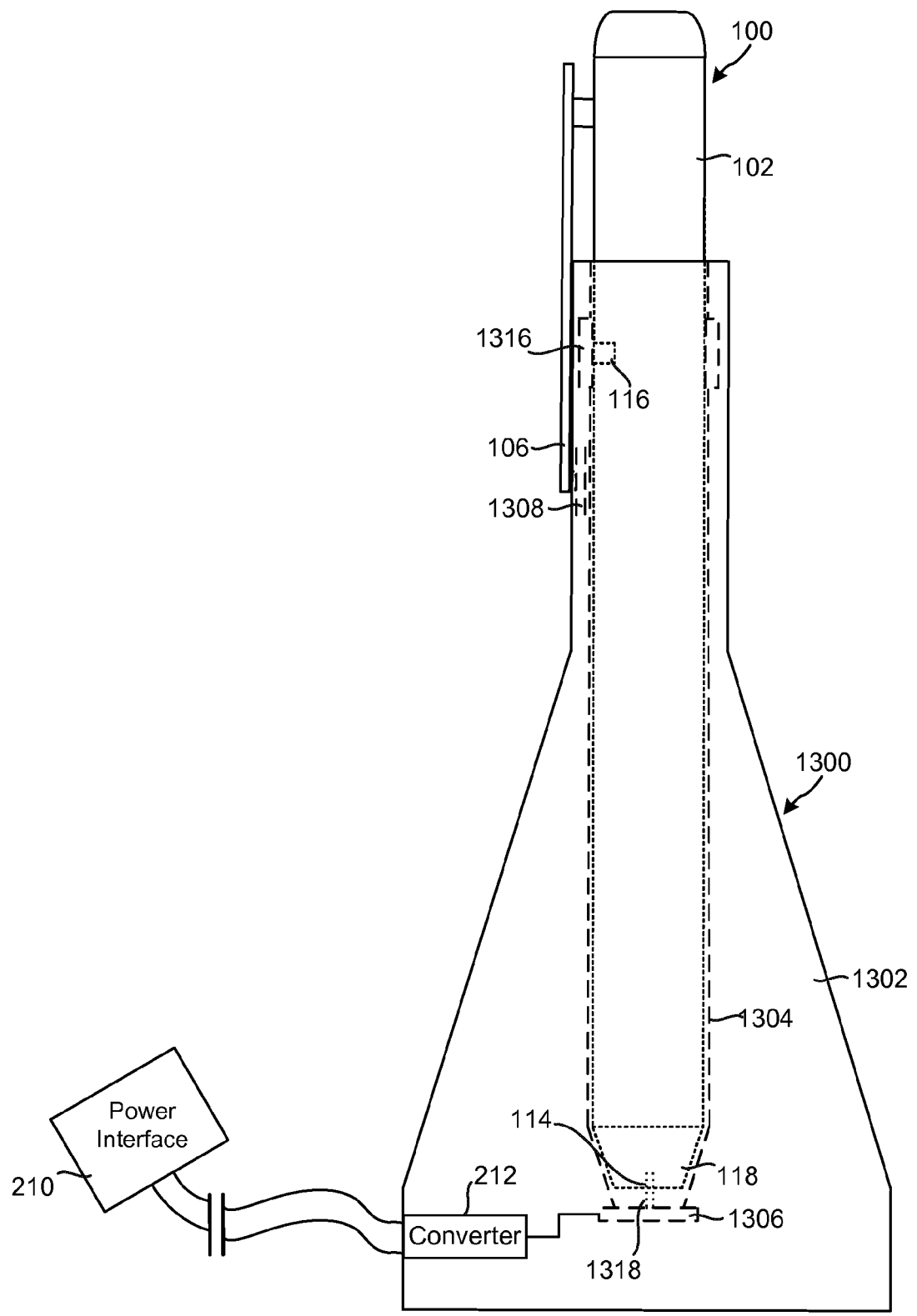
FIG. 13 illustrates an overview of another system for implementing embodiments of the present disclosure.

FIG. 13 illustrates a charging component 1300 similar to the charging component 200. However, a first electrode 1306 of the charging component 1300 is modified to include a metal extension 1318 adapted to extend into and mate with a tip connection port 114 in an end 118 of the stylus device 100. The tip connection port 114 may be a female connector that receives a corresponding male connector of a tip (such as tip 104) to electrically couple the tip to the stylus device 100 and/or one or more components of the stylus device 100. Similar to the charging component 200, the charging component 1300 includes a body 1302 and a receiving area 1304 for receiving the stylus device 100 to charge the stylus device 100. A first electrical contact 1306 is disposed in the body 1302 at the bottom portion of the receiving area 1304 and includes the metal extension 1318 extending into the receiving area 1304. This metal extension is sized and shaped to extend into and mate with the tip connection port 114 in the end 118 of the stylus device 100 when the stylus device 100 is disposed in the receiving area 1304. A second electrical contact 1308 is also disposed in the body 1302 and positioned to contact the clip 106 to provide a ground connection when the stylus device 100 is disposed in the receiving area 1304.

In this embodiment, the charging component 1300 may also include a third electrical contact 1316 and the stylus device 100 may include a corresponding electrical contact 116. The tip connection port 114 and the first electrical contact 1306 (via the metal extension 1318) provide the voltage input, the second electrical contact 1308 and the clip 106 provide the voltage low (i.e., circuit ground) connection, and the third electrical contact 1316 and the electrical contact 116 may provide an earth ground connection when the stylus device 100 is disposed in the receiving area 1304.

Figure 14:
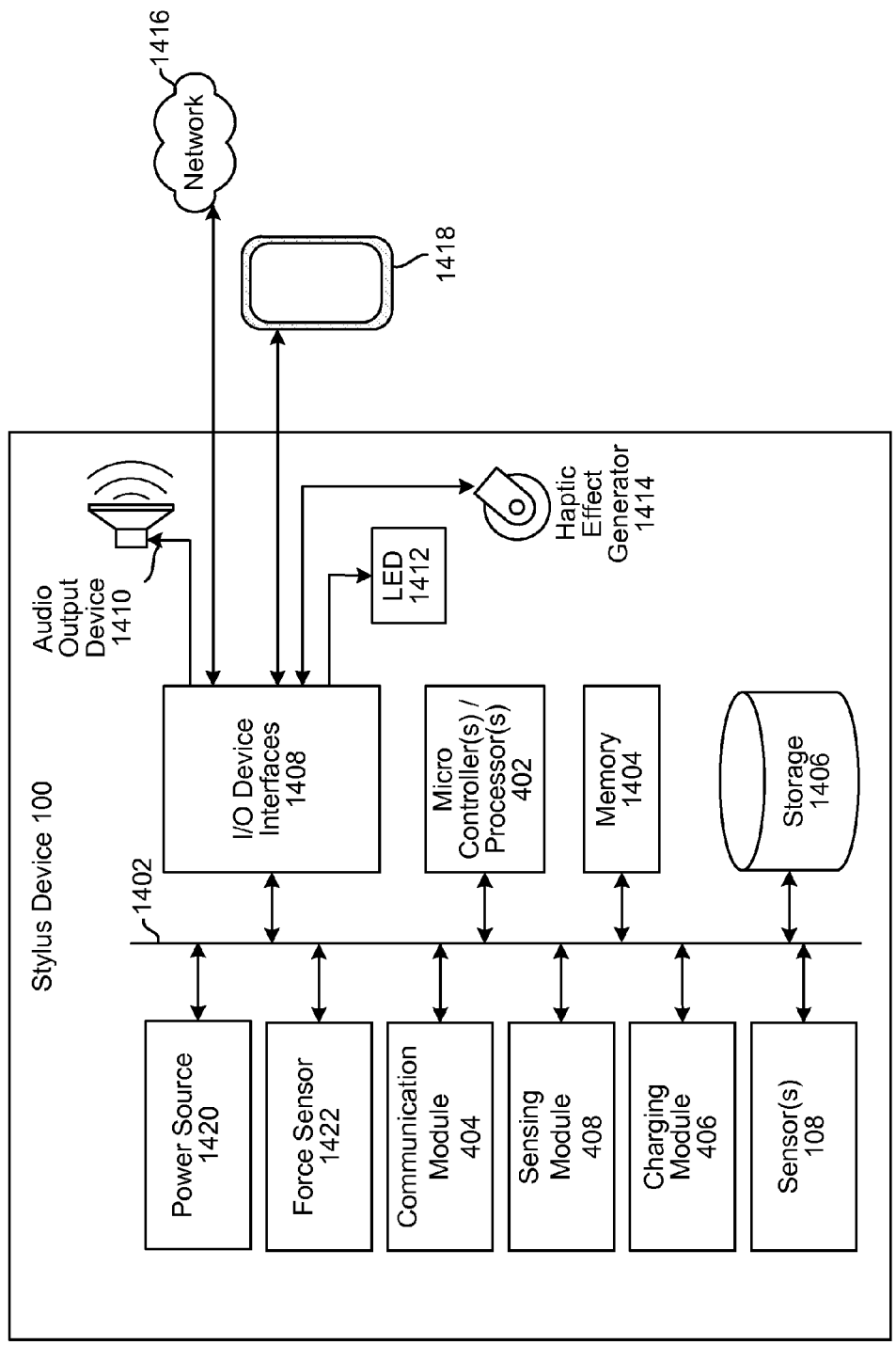
FIG. 14 is a functional block diagram conceptually illustrating example components of a stylus device according to embodiments of the present disclosure.

FIG. 14 is a block diagram conceptually illustrating example components of the stylus device 100. In operation, the stylus device 100 may include computer-readable and computer-executable instructions that reside on the stylus device 100, as will be discussed further below.

As illustrated in FIG. 14, the stylus device 100 may include an address/data bus 1402 for conveying data among components of the stylus device 100. Each component within the stylus device 100 may also be directly connected to other components in addition to (or instead of) being connected to other components across the bus 1402.

The stylus device 100 may include one or more microcontrollers/controllers/processors 402 that may each include a central processing unit (CPU) for processing data and computer-readable instructions, and a memory 1404 for storing data and instructions. The memory 1404 may include volatile random access memory (RAM), non-volatile read only memory (ROM), non-volatile magnetoresistive (MRAM) and/or other types of memory. The stylus device 100 may also include a data storage component 1406, for storing data and microcontrollers/controller/processor-executable instructions (e.g., instructions to perform one or more steps of the methods illustrated in FIGS. 5-8 and 11 and/or operations describe with reference to FIGS. 1-4, 9, 10, 12A and 12B, and 13). For example, the micro controller 402 may execute instructions to detect when the stylus device 100 is in the charging component and switch the stylus device between the tip communication mode and the tip charging mode. The data storage component 1406 may include one or more non-volatile storage types such as magnetic storage, optical storage, solid-state storage, etc. The stylus device 100 may also be connected to removable or external non-volatile memory and/or storage (such as a removable memory card, memory key drive, networked storage, etc.) through input/output device interfaces 1408.

Instructions for operating the stylus device 100 and its various components may be executed by the microcontroller(s)/controller(s)/processor(s) 402, using the memory 1404 as temporary "working" storage at runtime. The instructions may be stored in a non-transitory manner in non-volatile memory 1404, storage 1406, or an external device. Alternatively, some or all of the executable instructions may be embedded in hardware or firmware in addition to or instead of software.

The stylus device 100 includes input/output device interfaces 1408. A variety of components may be connected through the input/output device interfaces 1408, such as an audio output device for producing sound, such as speaker(s) 1410; a light emitting diode (LED) 1412; a haptic generator 1414; and/or other components, such as, one or more audio capture device(s), such as a microphone or an array of microphones; buttons; and other components. The speaker(s) 1410, the LED 1412, the haptic generator 1414 and other components may be integrated into the stylus device 100 or may be separate.

The input/output device interfaces 1408 may also include an interface for an external peripheral device connection such as universal serial bus (USB), FireWire, Thunderbolt or other connection protocol. The input/output device interfaces 1408 or communication module 404 may also include a connection to one or more wireless networks 1416, such as a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus device 100 may connect to a computing device 1418 via one of these connections. Additionally, in some embodiments, the computing device 1418 and the stylus device 100 may communicate using electromagnetic communications or capacitive communications. For example, electric fields generated by each device to transmit data on a carrier frequency. In one example, the tip may receive a signal from the computing device 1418, the stylus device 100 resonates with the computing device 1418 based on the received signal and reiterates the signal back to the computing device 1418 to communicate. In another example, as described above, the communication module 404 may include circuitry to provide a communication interface between a touch controller of a computing device 1418 and the stylus device 100.

The stylus device 100 further includes a power source 1420, such as a rechargeable battery; a force sensor 1422, communication module 404, charging module 406, sensing module 408, and the capacitive sensor 108. The force sensor 1422 may measure an amount of force (for example, pressure, shear, and any other force in any direction) at the tip of the stylus device 100, and may be for example, an optical pressure sensor, a capacitive pressure sensor, a piezoelectric sensor, a piezoelectric resistive sensor, or other sensor capable of measuring pressure and/or force. This measured force may be transmitted to the computing device 1418 via the tip of the stylus device 100 when the stylus device is being used and is in the tip communication mode.

As described above, the communication module 404 and charging module 406 may use the same physical circuitry, but function differently to transmit and receive data through the tip and receive a voltage through the tip, respectively. For example, the communication module 404 and the charging module 406 may be implemented by changing an internal multiplexer (MUX) of the stylus device 100 to cause the stylus device 100 to switch from the tip charging mode to the tip communication mode and vice versa. The sensing module 408 may sense or detect when the stylus device 100 is disposed in the charging component by detecting a charging voltage being applied to the stylus device 100, as described above.

As described above, the capacitive sensor 108 may be used to detect when a user is holding the stylus device 100, and may also be configured to detect a signal from the charging component. This signal, when detected, informs the stylus device 100 that the stylus device 100 is disposed in the charging component and the power source 1420 is to be charged. The stylus device 100 may then configure itself into the tip charging mode, in which the tip is connected to the charging module 406 to allow the power source 1420 of the stylus device 100 to be charged.

While certain embodiments are described above, it should be appreciated that any of the features of any of the embodiments may be implemented and/or substituted in any embodiment. Further, it should be appreciated that many different designs may be implemented and configured to operate in accordance with the aspects of the disclosure.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or electronics should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A rechargeable stylus device, comprising:
   a stylus body;
   a rechargeable battery disposed in the stylus body;
   a conductive tip coupled to a first end of the stylus body, wherein the conductive tip is configured to receive a voltage from a charging component when the stylus device is disposed in the charging component and the conductive tip contacts a first electrical contact of the charging component;
   a conductive clip coupled to the stylus body proximal to a second end of the stylus body opposite the first end, wherein the conductive clip is configured to provide a ground connection when the stylus device is disposed in the charging component and the conductive clip contacts a second electrical contact of the charging component;
   a processor disposed in the stylus body and configured to:
      detect that the stylus device is disposed in the charging component based on a varying capacitance being detected,
      decouple the conductive tip from communication circuitry in the stylus body, and
      couple the conductive tip to charging circuitry in the stylus body to allow the conductive tip to receive the voltage from the charging component and apply the voltage to the rechargeable battery, via the charging circuitry, to charge the rechargeable battery; and
   a capacitive sensor coupled to the processor and configured to detect the varying capacitance between the capacitive sensor and the charging component when the stylus device is disposed in the charging component.

2. The rechargeable stylus device of claim 1, wherein the processor is further configured to communicate with a computing device by transmitting or receiving data through the conductive tip using the communication circuitry when the communication circuitry is coupled to the conductive tip.

3. A stylus device, comprising:
   a stylus body;
   a battery disposed in the stylus body;
   a conductive tip coupled to a first end of the stylus body and in electrical communication with the battery when the conductive tip is coupled to charging circuitry in the stylus body;
   a processor disposed in the stylus body and configured to couple the conductive tip to the charging circuitry to charge the battery when:
      a varying capacitance is detected, indicating the stylus device is disposed in a charging component, and
      the conductive tip contacts a first electrical contact of the charging component; and
   a capacitive sensor coupled to the processor and configured to detect the varying capacitance between the capacitive sensor and the charging component when the stylus device is disposed in the charging component.

4. The stylus device of claim 3, wherein the conductive tip is removable from the stylus body and is removably coupled to a tip connection port in the first end, and the tip connection port is used to receive the electrical charge and apply the electrical charge to the battery through the charging circuitry when the conductive tip is removed.

5. The stylus device of claim 3, wherein the processor is further configured to
   detect that the stylus device is disposed in the charging component based on detecting the varying capacitance, and
   decouple the conductive tip from communication circuitry in the stylus body in response to detecting the stylus device is disposed in the charging component.

6. The stylus device of claim 3, further comprising:
   a first stylus electrical contact coupled to the stylus body and configured to contact a second electrical contact of the charging component; and
   a second stylus electrical contact coupled to the stylus body and configured to contact a third electrical contact of the charging component,
   wherein the processor is further configured to couple the conductive tip to the charging circuitry in response to the first stylus electrical contact contacting the second electrical contact of the charging component and the second stylus electrical contact contacting the third electrical contact of the charging component.

7. The stylus device of claim 3, further comprising a conductive clip coupled to the stylus body proximal to a second end of the stylus body opposite the first end, wherein the conductive clip is configured to provide a ground connection when the stylus device is electrically connected to the charging component.

8. The stylus device of claim 3, further comprising a conductive mount attaching a clip to the stylus body proximal to a second end of the stylus body opposite the first end, wherein the conductive mount is configured to provide a ground connection when the stylus device is electrically connected to the charging component.

9. The stylus device of claim 3, further comprising an electrical contact coupled to the stylus body, wherein the electrical contact is configured to provide a ground connection when the stylus device is electrically connected to the charging component.

10. A method of charging a stylus device, comprising:
    detecting, by a capacitive sensor of the stylus device, a varying capacitance between the capacitive sensor and a charging component, the varying capacitance indicating that the stylus device is disposed in the charging component;
    coupling, by the stylus device, a conductive tip of the stylus device to charging circuitry in the stylus device to place the conductive tip in electrical communication with a battery of the stylus device in response to the varying capacitance being detected;
    receiving, by the conductive tip, an electrical charge from the charging component; and
    applying, by the stylus device, the electrical charge to the battery.

11. The method of claim 10, wherein the conductive tip is removable and removably coupled to a tip connection port in a first end of the stylus device, and further comprising using the tip connection port to receive the electrical charge and apply the electrical charge to the battery through the charging circuitry when the conductive tip is removed.

12. The method of claim 10, further comprising decoupling the conductive tip from communication circuitry in the stylus device in response to the stylus device being disposed in the charging component.

13. The method of claim 10, further comprising:
detecting electrical contact between a first stylus electrical contact coupled to the stylus device and a first electrical contact of the charging component, and electrical contact between a second stylus electrical contact coupled to the stylus device and a second electrical contact of the charging component; and
wherein the coupling includes coupling the conductive tip to the charging circuitry in response to detecting the electrical contact between the first stylus electrical contact and the first electrical contact of the charging component, and the second stylus electrical contact and the second electrical contact of the charging component.

14. The method of claim 10, further comprising providing, by a conductive clip coupled to the stylus device, a ground connection when the stylus device is electrically connected to the charging component.

15. The method of claim 10, further comprising providing, by a conductive mount attaching a clip to the stylus device, a ground connection when the stylus device is electrically connected to the charging component.

16. The method of claim 10, further comprising providing, by an electrical contact disposed on the stylus device, a ground connection when the stylus device is electrically connected to the charging component.

* * * * *